(12) United States Patent
Nakamura et al.

(10) Patent No.: US 11,431,575 B2
(45) Date of Patent: Aug. 30, 2022

(54) NETWORK SYSTEM, TOPOLOGY MANAGEMENT METHOD, AND PROGRAM

(71) Applicant: Nippon Telegraph and Telephone Corporation, Tokyo (JP)

(72) Inventors: Mizuto Nakamura, Musashino (JP); Miwaka Otani, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/975,299

(22) PCT Filed: Feb. 21, 2019

(86) PCT No.: PCT/JP2019/006611
§ 371 (c)(1),
(2) Date: Aug. 24, 2020

(87) PCT Pub. No.: WO2019/163912
PCT Pub. Date: Aug. 29, 2019

(65) Prior Publication Data
US 2020/0412619 A1    Dec. 31, 2020

(30) Foreign Application Priority Data

Feb. 26, 2018   (JP) .............................. JP2018-032411

(51) Int. Cl.
*H04L 41/12* (2022.01)
*H04L 12/46* (2006.01)
(Continued)

(52) U.S. Cl.
CPC .......... *H04L 41/12* (2013.01); *H04L 12/4641* (2013.01); *H04L 45/02* (2013.01); *H04L 47/765* (2013.01)

(58) Field of Classification Search
CPC ..... H04L 41/12; H04L 12/4641; H04L 45/02; H04L 47/765; H04L 45/42; H04L 45/64; H04L 45/021
See application file for complete search history.

(56) References Cited

U.S. PATENT DOCUMENTS

| 6,502,175 B1 * | 12/2002 | Krishnan ............ H04L 67/2842 711/119 |
| 2003/0009552 A1 * | 1/2003 | Benfield ................. H04L 41/22 709/224 |

(Continued)

FOREIGN PATENT DOCUMENTS

| JP | 5256406 | 8/2013 |
| JP | 2016-184870 | 10/2016 |

OTHER PUBLICATIONS

Google Translation of JP-2016-184870, Oct. 20, 2016, p. 1-22 (Year: 2016).*

*Primary Examiner* — Tonia L Dollinger
*Assistant Examiner* — Joseph M Cousins
(74) *Attorney, Agent, or Firm* — Fish & Richardson P.C.

(57) ABSTRACT

A network system includes a storage unit that stores topology information in a graph database in chronological order, the topology information including end point information and connection information of logical resources of the virtual network, end point information and connection information of physical resources of the physical network, and correspondence information between the logical resources and the physical resources; a setting information acquirer that acquires setting information of the virtual network from the orchestrator using a change notification from the orchestrator as a trigger; and a topology information management unit that updates the topology information stored in the graph database of the storage unit on the basis of the acquired setting information.

15 Claims, 15 Drawing Sheets

(51) Int. Cl.
  *H04L 45/02* (2022.01)
  *H04L 47/765* (2022.01)

(56) References Cited

U.S. PATENT DOCUMENTS

| | | | | |
|---|---|---|---|---|
| 2005/0018602 | A1* | 1/2005 | Labovitz | H04L 41/12 |
| | | | | 370/229 |
| 2010/0306275 | A1* | 12/2010 | Maheshwari | G06F 11/0709 |
| | | | | 715/239 |
| 2017/0102933 | A1* | 4/2017 | Vora | H04L 43/0817 |
| 2017/0366395 | A1* | 12/2017 | Goldfarb | H04L 67/42 |
| 2018/0309637 | A1* | 10/2018 | Gill | H04L 41/12 |
| 2018/0316594 | A1* | 11/2018 | Wu | H04L 45/64 |

\* cited by examiner

NETWORK SYSTEM, TOPOLOGY MANAGEMENT METHOD, AND PROGRAM

CROSS-REFERENCE TO RELATED APPLICATIONS

This application is a National Stage application under 35 U.S.C. § 371 of International Application No. PCT/JP2019/006611, having an International Filing Date of Feb. 21, 2019, which claims priority to Japanese Application Serial No. 2018-032411, filed on Feb. 26, 2018. The disclosure of the prior application is considered part of the disclosure of this application, and is incorporated in its entirety into this application.

TECHNICAL FIELD

The present invention relates to a network system, a topology management method, and a program.

BACKGROUND ART

In the related art, network virtualization has been proposed as a technique for realizing effective use of network resources. Virtualization is to accommodate a plurality of logical virtual network topologies (VNTs) on a physical infrastructure network (physical network). A VNT is allocated to each service such as, for example, an audio-related service or a video-related service. With such virtualization, individual VNTs are optimally controlled autonomously using a VNT control technique (see NPL1) and efficient resource utilization of the entire physical network is achieved using a technique of distributed resource control for each VNT. Here, distributed resource control refers to, for example, control of bands distributed to physical links constituting each VNT.

PTL1 describes a network visualization device that displays information regarding VNTs accommodated in a physical network. The network visualization device described in PTL1 visualizes networks such that the state of resource sharing between VNTs, the status of resource allocation to each VNT, and the behavior of each VNT can be determined.

FIG. 12 is a schematic configuration diagram illustrating virtualized networks formed of a physical network and virtual networks.

The physical network (infrastructure network) 1 includes nodes 2 and links 3 that connect the nodes 2 as illustrated in FIG. 12. The physical network 1 is, for example, a WDM network in which nodes 2 are connected by optical fibers.

A virtual network 11-1, a virtual network 11-2, and a virtual network 11-3 are configured on the physical network 1. The virtual network 11-1, the virtual network 11-2, and the virtual network 11-3 are configured by performing network virtualization using a layer-1 technology such as wavelength division multiplexing (WDM) or time division multiplexing (TDM), a layer-2 technology such as Ethernet (trade name), and a layer-3 technology such as packet switching in combination to virtually divide physical resources of the physical network 1 and then combining the divided physical resources.

The virtual network 11-1 is a network virtually constructed on the physical network 1. The virtual network 11-1 is, for example, a virtual network defined by IEEE 802.1Q. The virtual network 11-1 includes nodes 12 as with the physical network 1 and includes paths 13 different from those of the physical network 1. An end user 21-1 is connected to the virtual network 11-1 through an edge router 22-1 and is connected to an IA server 23-1 (PC server) via the virtual network 11-1. The end user 21-1 can connect to an application service on the IA server 23-1 through the virtual network 11-1.

The virtual network 11-2 is a network virtually constructed on the physical network 1, similar to the virtual network 11-1. The virtual network 11-2 includes nodes 12 as with the physical network 1 and includes paths 13 different from those of the physical network 1. An end user 21-2 is connected to the virtual network 11-2 through an edge router 22-2 and is connected to an IA server 23-2 via the virtual network 11-2. The end user 21-2 can connect to an application service on the IA server 23-2 through the virtual network 11-2.

The virtual network 11-3 is a network virtually constructed on the physical network 1, similar to the virtual networks 11-1 and 11-2. The virtual network 11-3 includes nodes 12 as with the physical network 1 and includes paths 13 different from those of the physical network 1. An end user 21-3 is connected to the virtual network 11-3 through an edge router 22-3 and is connected to an IA server 23-3 via the virtual network 11-3 before relocation of a node "#5". Before relocation of the node "#5," the end user 21-3 can connect to an application service on the IA server 23-3 through the virtual network 11-3.

Hereinafter, the virtual networks 11-1, 11-2, and 11-3 are simply referred to as virtual networks 11 unless otherwise distinguished. The virtual networks 11-1, 11-2 and 11-3 are managed by an operator 50.

A resource management device 30 managed by the operator 50 is connected to the virtual networks 11. The resource management device 30 controls the infrastructure network 1 and the virtual networks 11 by controlling the nodes 12. The resource management device 30 dynamically reconfigures virtual network topologies and distributes physical resources to the virtual networks 11 such that each virtual network 11 is stably accommodated in the infrastructure network 1.

Each virtual network 11 may have a route or topology fixedly constructed depending on its operation conditions, while dynamic topology optimization control may also be performed such that the topology of each virtual network 11 changes to adapt to environmental changes. The dynamic topology optimization control can improve adaptability of each virtual network 11 to environmental changes.

Incidentally, in the virtualized networks formed of a plurality of physical and logical resources, network configurations dynamically change constantly due to software update, maintenance, or the like even if no failures occur. For example, when a node 2 (node "#5") of the physical network 1 indicated by a dashed box in FIG. 12 is in maintenance, a node 12 (node "#5") of the virtual network 11-2 is eliminated. In this case, the resource management device 30 relocates nodes 12 (nodes "#5") of the virtual networks 11-2 and 11-3 to nodes 12 (nodes "#4") of the virtual networks 11-2 as indicated by a reference sign a in FIG. A. Further, when the application (APL "#3") of the IA server 23-3 is updated, the IA server 23-3 is connected to the node 12 (node "#4") of the virtual network 11-3 as indicated by a reference sign b in FIG. 12. Also, configuration change without intervention of an operator, network (hereinafter also referred to as "NW" as appropriate) may be performed.

CITATION LIST

Patent Literature

PTL1: Japanese Patent No. 5256406

SUMMARY OF THE INVENTION

Technical Problem

However, network configurations dynamically change constantly due to software update, maintenance of devices, or the like even if no failures occur. Thus, virtualized networks formed of a plurality of physical and logical resources have the following problems.

It is difficult to determine a topology in real time because the topology constantly changes.

In addition, it is difficult to identify (hereinafter also referred to as "isolate" as appropriate) the cause and location of a failure because the network topology may change before and after the failure occurs due to auto-healing or the like.

FIG. 13 is a diagram illustrating problems of virtualized networks formed of a physical network and virtual networks. The same components as those in FIG. 12 are denoted by the same reference signs.

Automatic control, for example, using the occurrence of a failure as a trigger, relocates a node 12 (node "#4") in a virtual network 11-3 to a node 12 (node "#5") in the virtual network 11-3 as indicated by a reference sign c in FIG. 13. Along with this, an application (APL "#1") on the IA server 23-1 that has been connected to the node 12 (node "#4") in the virtual network 11-3 is connected to the node 12 (node "#5") in the virtual network 11-3.

Due to such a change in the network configuration by automatic control, it is difficult to identify the failure location through communicated confirmation in the IP layer as indicated by a reference sign d in FIG. 13.

In addition, the physical configuration also changes as indicated by a reference sign e and dashed arrows and circles f in the physical layer in FIG. 13.

As described above, the topology constantly changes, and thus it is difficult to determine a topology in real time.

The present invention has been made in view of such a background and it is an object of the present invention to provide a network system, a topology management method, and a program that can quickly identify the cause and location of a failure.

Means for Solving the Problem

To solve the problems described above, the disclosure according to claim 1 provides a network system including a virtual network formed on a physical network and an orchestrator that performs setting control with respect to an environmental change of the virtual network, the network system further including: a storage unit that stores topology information in a database in chronological order, the topology information including end point information and connection information of logical resources of the virtual network, end point information and connection information of physical resources of the physical network, and correspondence information between the logical resources and the physical resources; a setting information acquirer that acquires setting information of the virtual network from the orchestrator using a change notification from the orchestrator as a trigger; and a topology information management unit that updates the topology information stored in the database of the storage unit on the basis of the acquired setting information.

The disclosure according to claim 6 provides a topology management method for a topology management method for a network system, the network system including a virtual network formed on a physical network and an orchestrator that performs setting control with respect to an environmental change of the virtual network, the topology management method including: storing topology information in a database in chronological order, the topology information including end point information and connection information of logical resources of the virtual network, end point information and connection information of physical resources of the physical network, and correspondence information between the logical resources and the physical resources; acquiring setting information of the virtual network from the orchestrator using a change notification from the orchestrator as a trigger; and updating the topology information stored in a storage unit on the basis of the acquired setting information.

The disclosure according to claim 7 provides a program for causing a computer, which is a server device including a virtual network formed on a physical network and an orchestrator that performs setting control with respect to an environmental change of the virtual network, to function as: a storage module that stores topology information in a database in chronological order, the topology information including end point information and connection information of logical resources of the virtual network, end point information and connection information of physical resources of the physical network, and correspondence information between the logical resources and the physical resources; a setting information acquisition module that acquires setting information of the virtual network from the orchestrator using a change notification from the orchestrator as a trigger; and a topology information management module that updates the topology information stored in a storage unit on the basis of the acquired setting information.

Thus, by holding the topology information from the present to the past, it is possible to determine the topology in real time. It is also possible to cope with the possibility that the network topology may change before and after a failure occurs and to quickly identify the cause and location of the failure. In addition, it is not necessary to reconfigure an enormous number of virtualized networks, and thus the amount of calculation can be significantly reduced.

The disclosure according to claim 2 provides the network system according to claim 1, further comprising a topology reference unit that receives a reference request for the topology information and, when the topology information stored in the storage unit includes data of a period to be referred to, refers to the topology information of the period.

By doing so, it is possible to quickly respond to a report from the user and to enable quick failure isolation.

The disclosure according to claim 3 provides the network system according to claim 2, wherein the storage unit stores configuration information of individual devices of the physical network in the database, and the topology reference unit includes a topology calculator that calculates a topology on the basis of the configuration information stored in the storage unit when the topology information does not include data of the period to be referred to.

By doing so, even if the database includes no time series data of the period to be referred to, the topology can be calculated from the configuration information, whereby it is possible to respond to a report from the user and to enable failure isolation.

The disclosure according to claim 4 provides the network system according to claim 1, wherein the topology information management unit discards, from the database, the topology information that has a probability of being referred to of equal to or less than a predetermined value and/or the topology information that is older than a predetermined time.

By doing so, past data having a low probability of being referred to or the like can be deleted from the database and the amount of data stored in the database can be reduced.

The disclosure according to claim 5 provides the network system according to claim 3, further comprising an output unit that outputs the topology information referred to by the topology reference unit or the topology calculated by the topology calculator.

By doing so, it is possible to perform an isolation task while visualizing the topology to respond to the user.

Effects of the Invention

According to an embodiment of the present invention, it is possible to provide a network system, a topology management method, and a program that can quickly identify the cause and location of a failure.

BRIEF DESCRIPTION OF DRAWINGS

FIG. 5A is an image diagram of a graph representation of the topology information and FIG. 5B illustrates a stored example of the topology information illustrated in FIG. 5A.

DESCRIPTION OF EMBODIMENTS

Hereinafter, a network system and the like in a mode for implementing the present invention (hereinafter referred to as the "embodiment of the present invention") will be described with reference to the drawings.
Conventional Technology A conventional network topology determination method will be described.

Methods of referring to a past topology include a method of reconfiguring a topology from logs of a management system and devices.

Figure 12:
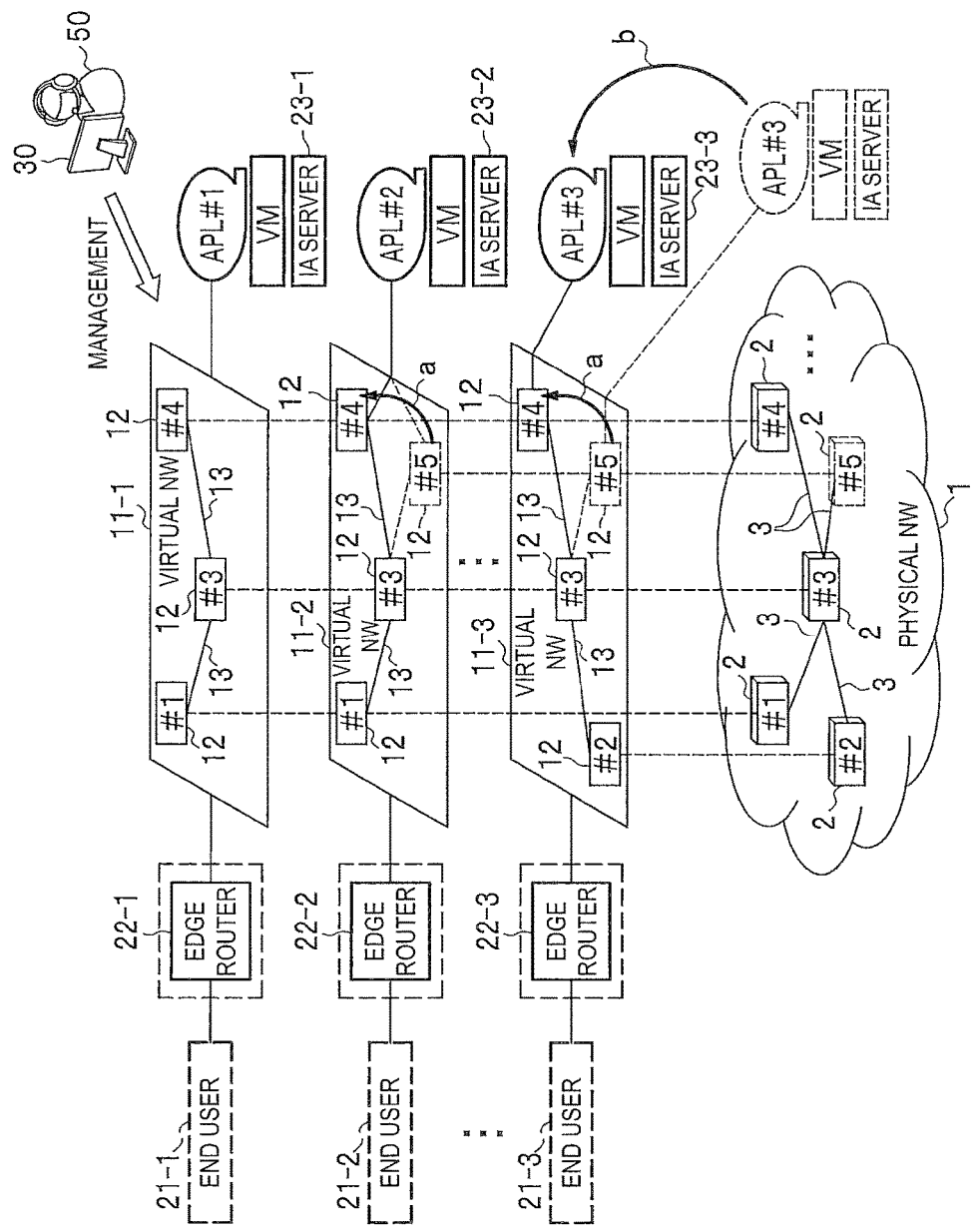
FIG. 12 is a schematic configuration diagram illustrating virtualized networks formed of a physical network and virtual networks.
Figure 13:
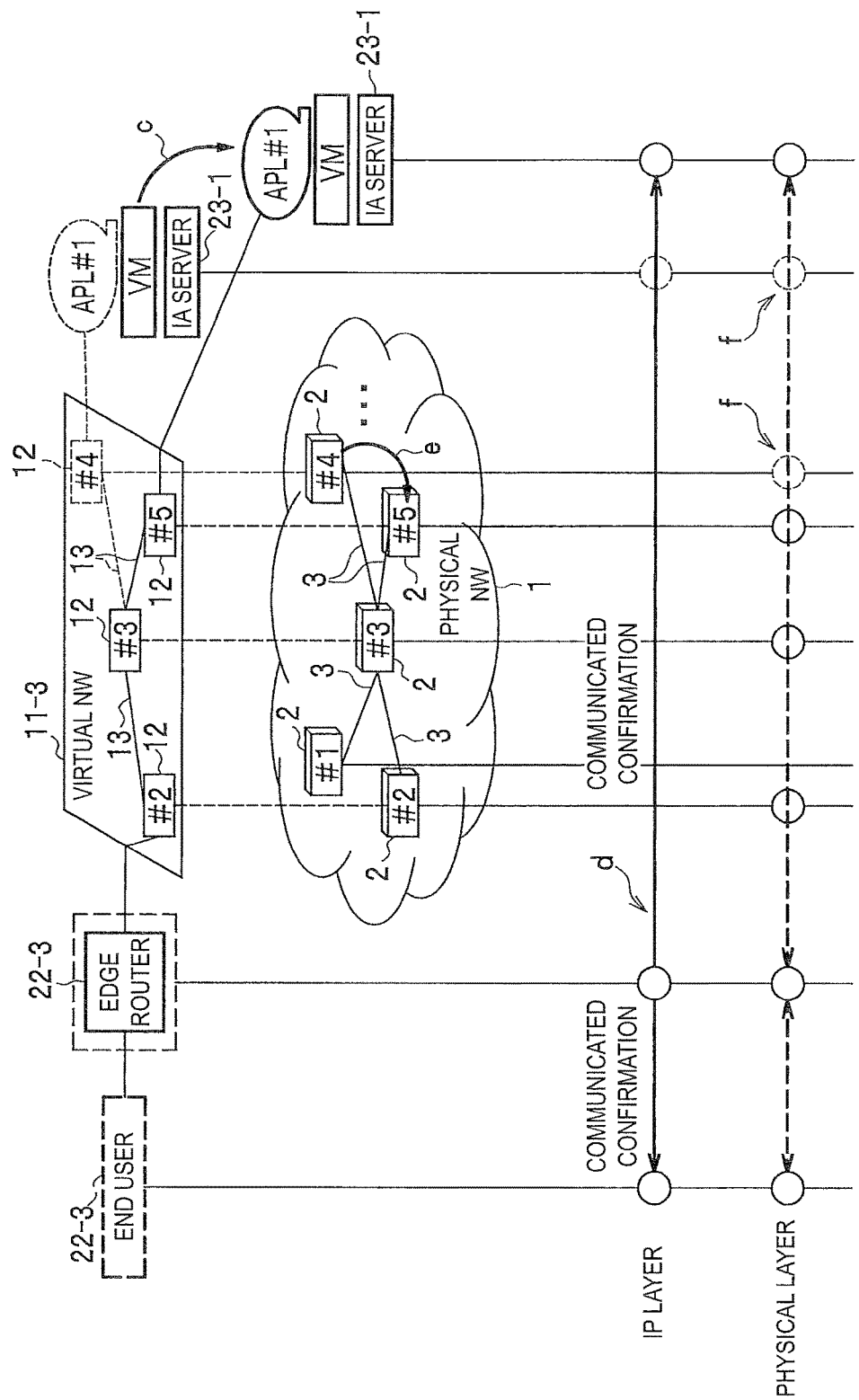
FIG. 13 is a diagram illustrating problems of virtualized networks formed of a physical network and virtual networks.
Figure 14:
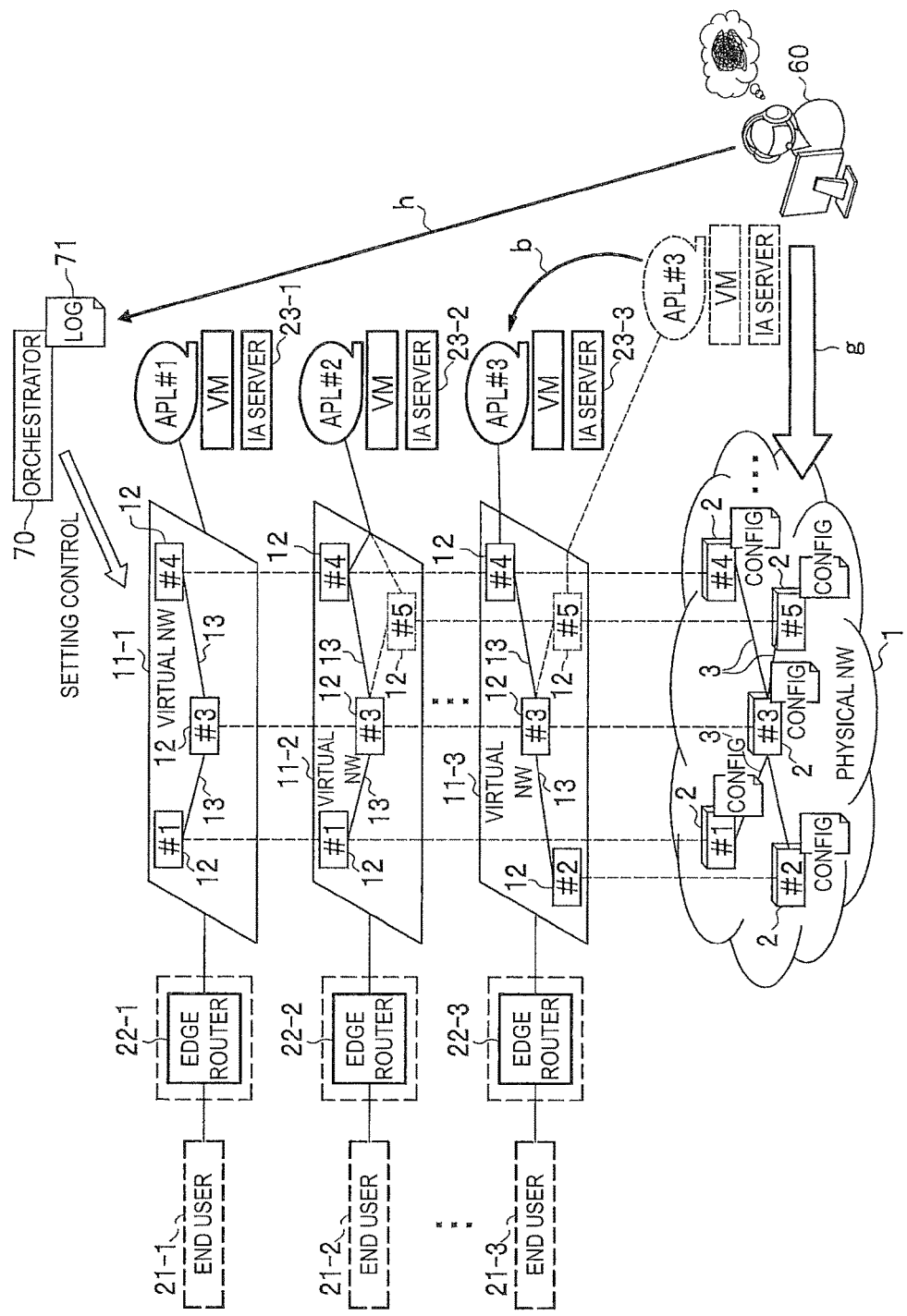
FIG. 14 is a diagram illustrating a conventional network topology determination method.

FIG. 14 is a diagram illustrating a conventional network topology determination method. The same components as those in FIG. 12 are denoted by the same reference signs.

In a method, an operator 60 obtains configuration (CONFIG) settings (an arrow g in FIG. 14) of devices and logs 71 (an arrow h in FIG. 14) of the management system (an orchestrator 70) and reconfigures a topology from the configuration settings and logs as indicated by an arrow h in FIG. 14.

However, the amount of calculation is huge when an enormous number of virtualized networks are reconfigured from logs of the management system and physical devices of a carrier network (nodes 2 of a physical network 1) or the like (see connection relationships between logical resources).

Problem in Following Dynamic Changes of Virtual Networks

Figure 15:
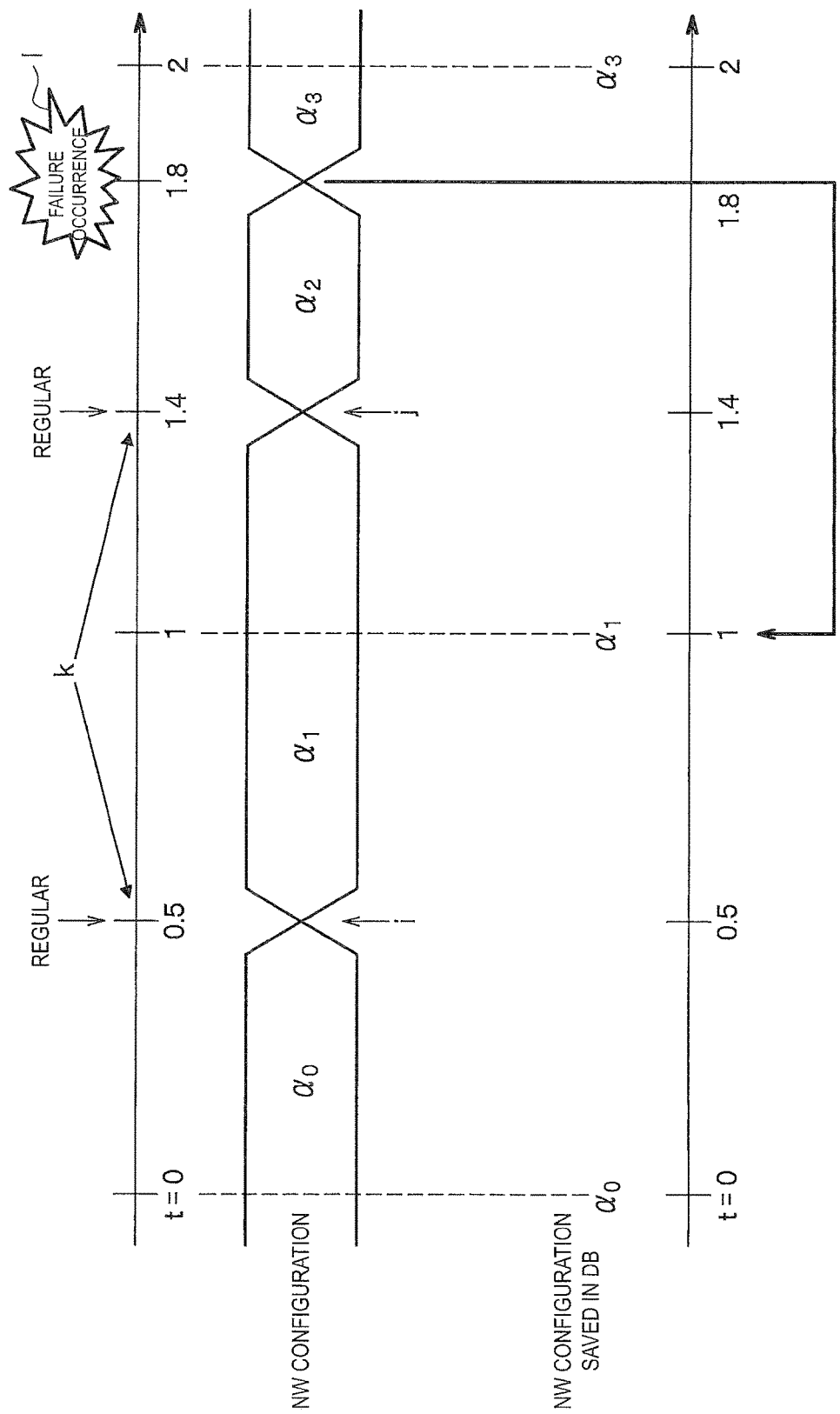
FIG. 15 is an image diagram illustrating a problem in following dynamic changes of virtual networks.

FIG. 15 is an image diagram illustrating a problem in following dynamic changes of virtual networks. In FIG. 15, regarding users A, B. and C, a virtualized network #1 and VNFs, the virtualized network configuration of FIG. 12 is simplified and illustrated as a reference sign a. FIG. 15 illustrates that the virtualized network configuration α changes along a horizontal time axis and also illustrates images of past virtualized network configurations stored in a database, which is referred to by the operator 60 of FIG. 14, at times t=0, t=0.5, t=1, t=0, t=1.4, t=2, . . . .

The virtualized network configuration a in FIG. 15 is stored regularly (for example, updated regularly several times a day) in a database in FIG. 15B (which is referred to by the operator 60 in FIG. 14, the same being true below). In the case of FIG. 15, a virtualized network configuration $\alpha_0$ of t=0 is stored in the database at time t=0, a virtualized network configuration $\alpha_1$ of t=1 is stored in the database at the next time t=1, and a virtualized network configuration $\alpha_3$ of t=2 is stored in the database at the next time t=2.

When the virtualized network configuration $\alpha_0$ changes at t=0.5 as indicated by a reference sign i in FIG. 15, the changed configuration is stored in the database at time t=1. When the virtualized network configuration $\alpha_1$ changes at t=1.4 as indicated by a reference sign j in FIG. 15, the changed configuration is stored in the database at time t=2. Thus, when the virtualized network configuration α changes, the changed configuration is not stored in the database at the same time, but is stored at the next update time. In other words, regular updating cannot follow the virtualized network configuration of t=0.5 and the virtualized network configuration of t=1.4 in FIG. 15 (see a reference sign k in FIG. 15).

A failure occurs at t=1.8 as indicated by a reference sign 1 in FIG. 15. To determine the influence range of the failure occurrence, it is necessary to refer to configuration information (topology information and logical/physical correspondence information) of the virtualized network at the time of failure occurrence. Thus, the operator 60 of FIG. 14 refers to configuration information of the virtualized network stored in the database. The virtualized network configuration a has changed at t=1.4 and a failure has occurred at t=1.8 as illustrated in FIG. 15, and basically, it is necessary to refer to configuration information (topology information and the like) of the virtualized network configuration $\alpha_2$ to which the configuration has changed at t=1.4 as illustrated in FIG. 15. However, only the virtualized network configuration $\alpha_1$ of the timet=1 is stored in the database as illustrated in FIG. 15 and thus only topology information or the like different from that at the time of failure occurrence can be referred to.

EMBODIMENTS

Figure 1:
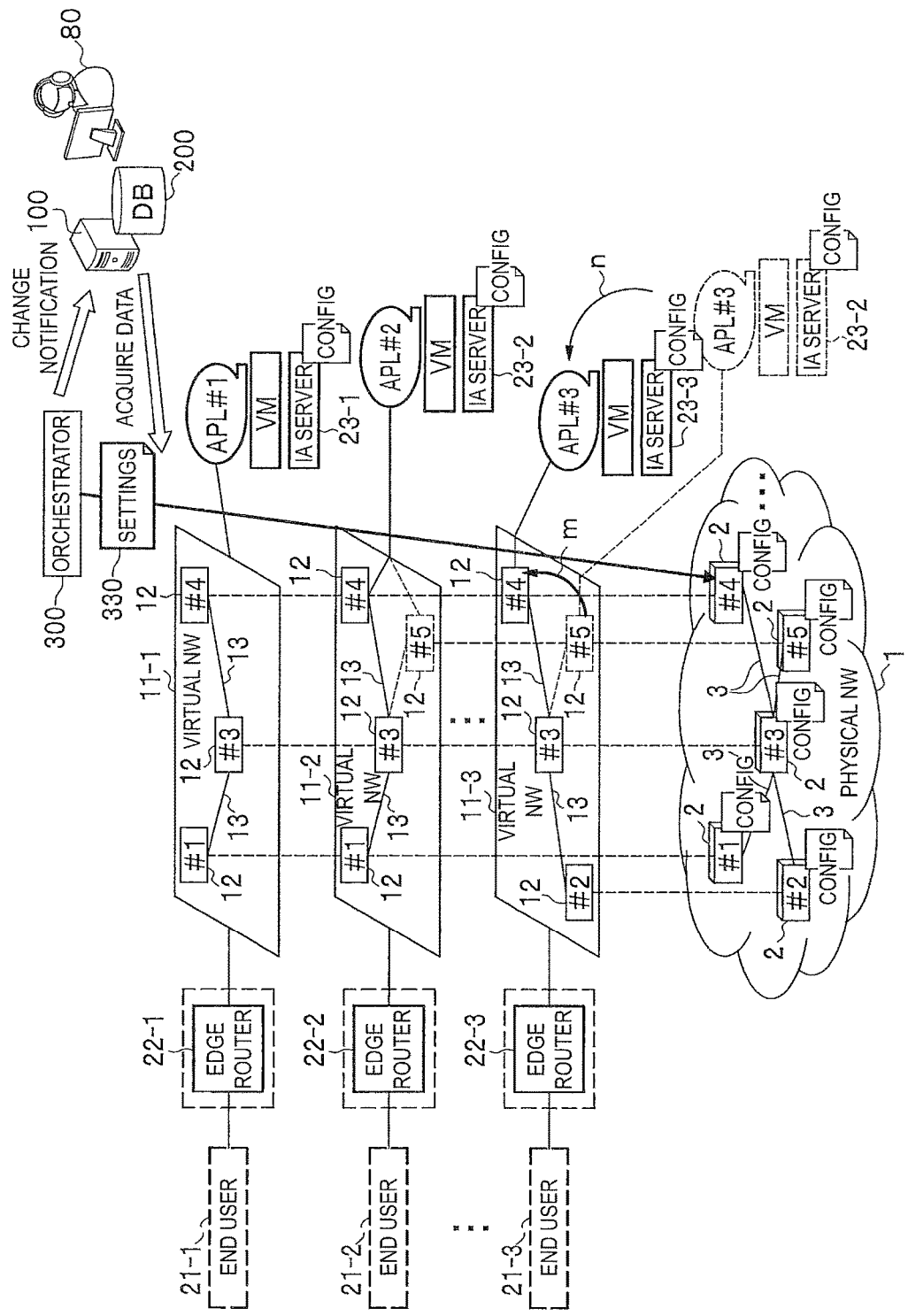
FIG. 1 is a configuration diagram illustrating a network system according to an embodiment of the present invention.

FIG. 1 is a configuration diagram showing a network system according to an embodiment of the present invention. The network system of the embodiment of the present invention is applied to virtualized networks formed of a physical network 1 and virtual networks 11.

As illustrated in FIG. 1, the network system includes the virtual networks 11 formed on the physical network 1, a time series management device 100 (which will be described later), a storage unit 130 (see FIG. 2) having databases (DBs) 200 (which will be described later), and an orchestrator 300 (which will be described later) that performs setting control of the virtual networks 11 with respect to environmental changes.

The time series management device 100 functions using an operation system used for operation task.

The orchestrator 300 is integrated management software that performs setting control of the virtual networks. An operator 80 who performs virtual network isolation performs management of each layer (such as monitoring and malfunction isolation) using the time series management device 100 and a graph database 220.

The operator 80 is different from the physical IP layer operator 60 (see FIG. 14) and the virtual network operator 50 (see FIG. 14). The graph database 220 is different from the database ("DB" in FIG. 15B) that is referred to by the operator 60 in FIG. 14.

The physical network (infrastructure network) 1 includes nodes 2 and links 3 that connect the nodes 2. The infrastructure network 1 is, for example, a WDM network in which nodes 2 are connected by optical fibers.

A layer-1 technology such as WDM or TDM, a layer-2 technology such as Ethernet (trade name), and a layer-3 technology such as packet switching are used in combination to perform network virtualization on the physical network 1 to virtually divide physical resources of the physical network 1 and the divided physical resources are combined to configure a virtual network 11-1, a virtual network 11-2, and a virtual network 11-3.

The virtual network 11-1 is a network virtually constructed on the physical network 1. The virtual network 11-1 is, for example, a virtual network defined by IEEE 802.1Q. The virtual network 11-1 includes nodes 12 as with the physical network 1 and includes paths 13 different from those of the physical network 1. An end user 21-1 is connected to the virtual network 11-1 through an edge router 22-1 and is connected to an IA server 23-1 (PC server) via the virtual network 11-1. The end user 21-1 can connect to an application service on the IA server 23-1 through the virtual network 11-1.

The virtual network 11-2 is a network virtually constructed on the physical network 1 as with the virtual network 11-1. The virtual network 11-2 includes nodes 12 as with the physical network 1 and includes paths 13 different from those of the physical network 1. An end user 21-2 is connected to the virtual network 11-2 through an edge router 22-2 and is connected to an IA server 23-2 via the virtual network 11-2. The end user 21-2 can connect to an application service on the IA server 23-2 through the virtual network 11-2.

The virtual network 11-3 is a network virtually constructed on the physical network 1 as with the virtual network 11-1. The virtual network 11-3 includes nodes 12 as with the physical network 1 and includes paths 13 different from those of the physical network 1. An end user 21-3 is connected to the virtual network 11-3 through an edge router 22-3 and is connected to an IA server 23-3 via the virtual network 11-3 before relocation of a node "#5". Before relocation of the node "#5," the end user 21-3 can connect to an application service on the IA server 23-3 through the virtual network 11-3.

Hereinafter, the virtual networks 11-1, 11-2, and 11-3 are simply referred to as virtual networks 11 unless otherwise distinguished.

In virtualized networks formed of a plurality of physical and logical resources, network configurations dynamically change constantly due to software update, maintenance, or the like even if no failures occur. For example, when a node 2 (node "#5") of the physical network 1 indicated by a dashed box in FIG. 1 is in maintenance, a node 12 (node "#5") of the virtual network 11-2 is eliminated. In this case, a resource management device (not shown) relocates nodes 12 (nodes "#5") of the virtual networks 11-2 and 11-3 to nodes 12 (nodes "#4") of the virtual networks 11-2 as indicated by a reference sign min FIG. 1. Further, when the application (APL "#3") of the IA server 23-3 is updated, the IA server 23-3 is relocated to the node 12 (node "#4") of the virtual network 11-3 as indicated by a reference sign n in FIG. 1. Also, network configurations change without intervention of an operator such as resource optimization and auto-healing may be performed.

Figure 2:
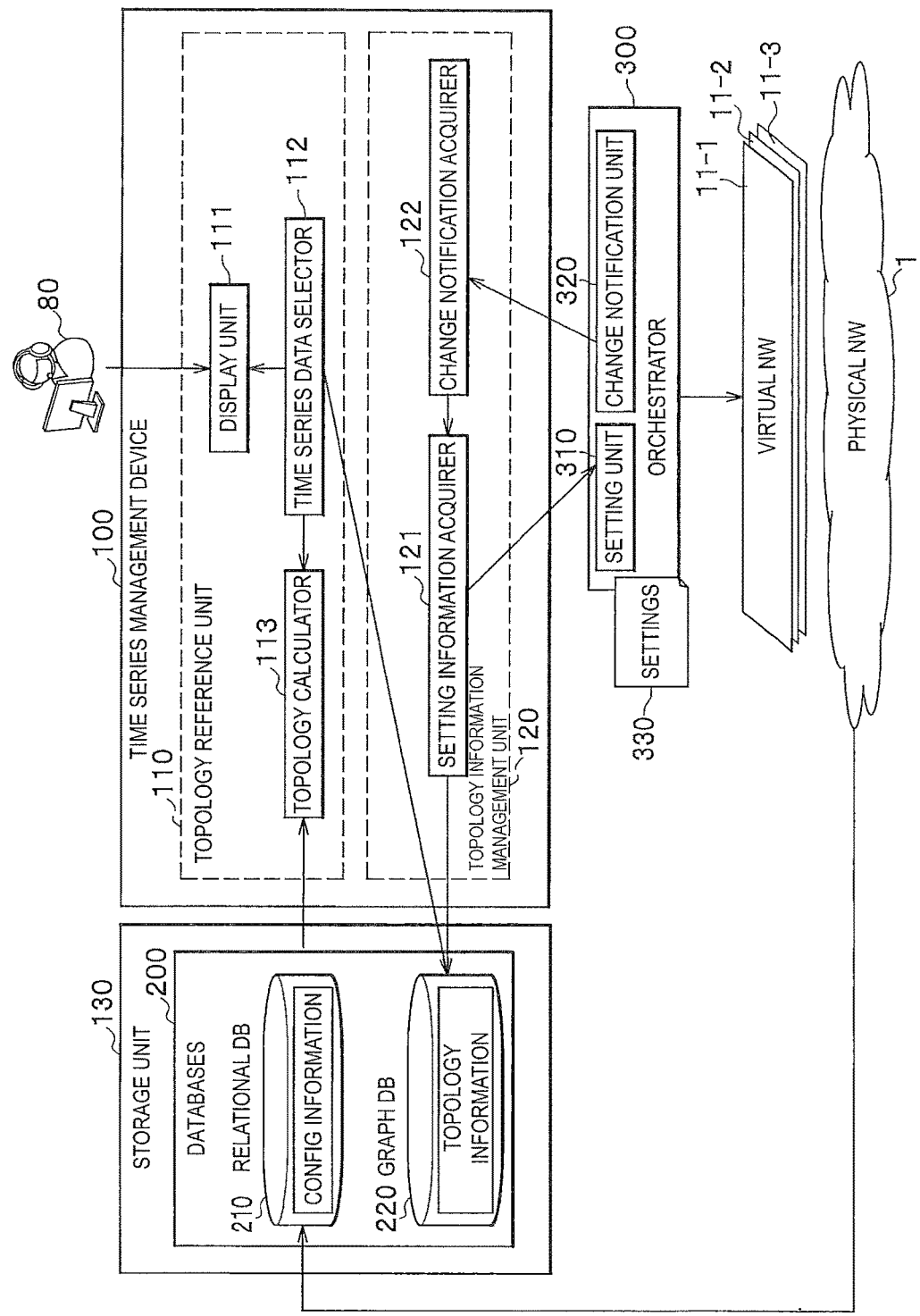
FIG. 2 is a block diagram illustrating a configuration of a time series management device, databases (DBs), and an orchestrator of the network system according to the embodiment of the present invention.

FIG. 2 is a block diagram illustrating configurations of the time series management device 100, the databases (DBs) 200, and the orchestrator 300 of the network system according to the embodiment of the present invention.

As illustrated in FIG. 2, the time series management device 100 includes a topology reference unit 110 that refers to configuration information 210A in a relational database 210 and a topology information management unit 120 that manages topology information 220A in the graph database 220.

Time Series Management Device 100 The topology reference unit 110 includes a display unit 111 (output unit), a time series data selector 112, and a topology calculator 113.

The topology reference unit 110 receives a reference request for topology information 220A from the orchestrator

300 and refers to and outputs topology information of a period to be referred to if the topology information stored in the graph database 220 in the storage unit 130 includes data of that period.

The display unit 111 displays the topology information 220A referred to by the topology reference unit 110 or the topology calculated by the topology calculator 113.

The time series data selector 112 receives a reference request for topology information and selects time series data of the period to be referred to (topology information 220A for a time to be referred to) from the topology information stored in the graph database 220 in the storage unit 130.

When there is no data for the period to be referred to (when there is no topology information for a specified time), the topology calculator 113 calculates a topology on the basis of the configuration information 210A stored in the relational database 210 of the storage unit 130.

The topology information management unit 120 includes a setting information acquirer 121 and a change notification acquirer 122.

The topology information management unit 120 updates the topology information 220A stored in the graph database 220 in the storage unit 130 on the basis of the acquired setting information. The topology information management unit 120 discards topology information 220A that has a low probability of being referred to and/or topology information 220A that is at least a predetermined time old from the graph database 220.

Using a change notification from the orchestrator 300 as a trigger, the setting information acquirer 121 acquires setting information of the virtual networks 11 (a setting-related function (setting information) of a general orchestrator) from the setting unit 310 in the orchestrator 300. The change notification acquirer 122 acquires a change notification function that is newly added (a change notification from the orchestrator 300).

Storage Unit 130

The storage unit 130 includes the databases 200. The databases 200 include the relational database 210 (see FIG. 3) storing configuration information 210A and the graph database 220 (see FIG. 4 and FIG. 5) storing topology information 220A.

The storage unit 130 stores configuration information 210A of each device of the physical network 1 in the relational database 210.

The storage unit 130 stores topology information 220A, which includes endpoint information and connection information of logical resources of each virtual network 11, endpoint information and connection information of physical resources of the physical network 1, and correspondence information between logical resources and physical resources, in the graph database 220 in chronological order.

The storage unit 130 may be any storage medium or storage means and may be installed inside or outside the time series management device 100. When installed outside, the storage unit 130 may be installed in another device via a network.

Orchestrator 300

The orchestrator 300 is integrated management software that performs setting control of the virtual networks. The orchestrator 300 includes a setting unit 310 that is a setting-related function of a general orchestrator (for example, the virtual network operator 50 in FIG. 14) and a change notification unit 320 that is a change notification function which is newly added. Setting information 330 is information on orders for changing settings of the networks. The configuration information and the like of each device are rewritten based on the setting information 330.

Relational Database 210

Figure 3:
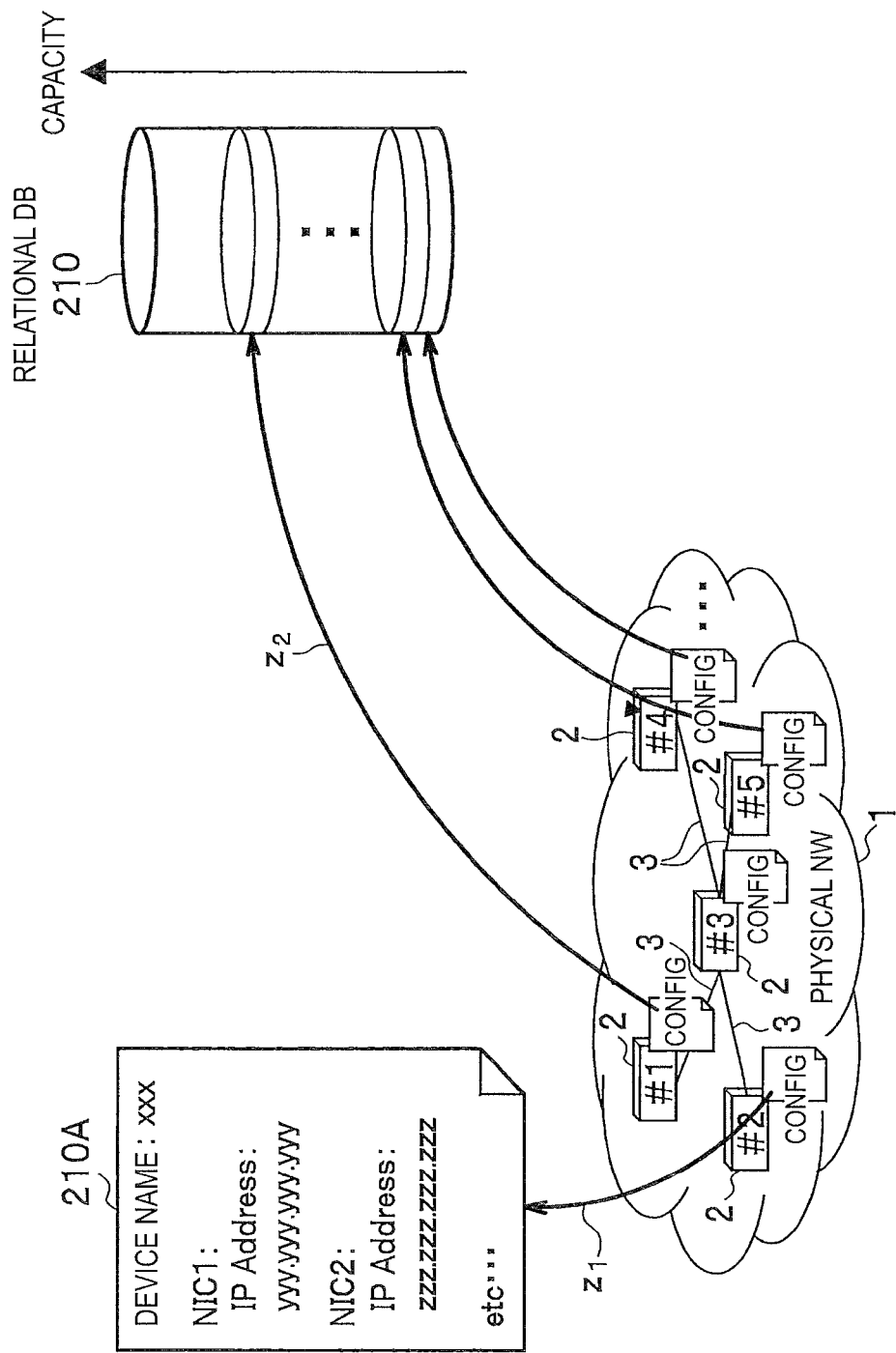
FIG. 3 is a diagram illustrating an example of configuration information stored in a relational database of the network system according to the embodiment of the present invention.

First, the configuration information 210A stored in the relational database 210 will be described. FIG. 3 is a diagram illustrating an example of the configuration information 210A stored in the relational database 210.

The relational database 210 stores configuration information 210A of each device indicated by a reference sign $z_1$ in FIG. 3. The configuration information 210A is, for example, as follows.

Device name: xxx
NIC1: IP Address:
yyy.yyy.yyy.yyy
NIC2:
IP Address:
zzz.zzz.zzz.zzz
etc. . . . .

Past configuration information 210A that is under management is data obtained by extracting a portion relating to a connection relationship from the configuration of each device as indicated by a reference sign $z_2$ in FIG. 3. This is individual data for each device, and it is assumed that the relational database or the like is used as a database for storing this data.

On the other hand, the following graph database 220 is used for the topology information 220A.

Graph Database 220

The graph database 220 manages management information regarding networks (performs data creation, data reading, data updating, and data deletion).

The graph database 220 manages topology information 220A (which will be described later with reference to FIG. 4).

The graph database 220 is a database for performing management of topology information (data creation, data reading, data updating, and data deletion). Although a graph type database is used in the present embodiment, a database of another format may also be used. The following is a comparison between databases.

Key-Value Type

Data is stored on a key-value basis. This is suitable for a system (such as an application (APL)) with a large reading load, for example, for applications such as games and moving image sharing.

Column-Oriented Type

Data is handled in units of columns. This is suitable for applications such as collection and analysis systems.

Graph Type

Data is stored in units of nodes, attributes, and relationships. This is suitable for storing network-like data. The example is a management system in which social networking service (SNS) users are connected and related. A graph type database is used in the embodiment of the present invention because the graph type is considered to be suitable for managing topology information.

Document-Oriented Type

Data is stored in units of structured documents such as JavaScript Object Notation (JSON) and Extensible Markup Language (XML). This is suitable for applications such as log analysis and web systems.

Topology Information 220A

Next, the topology information 220A managed by the graph database 220 will be described. FIG. 4 is a diagram illustrating an example of the topology information 220A managed by the graph database 220.

The management here refers to data creation, data reading, data updating, and data deletion. Data acquired as the topology information is connection information of each resource, for example, the following (1) to (3).

(1) End point information (see thin white circles and a reference sign o in FIG. 4) and connection information (see thick solid lines and a reference sign p in FIG. 4) of logical resources End points between logical resources are, for example, logical ports and virtual network interface cards (NICs).

(2) End point information (see thick white circles and a reference sign q in FIG. 4) and connection information (see thin solid lines and a reference sign r in FIG. 4) of physical resources End points between physical resources are, for example, physical ports and physical NICs. Further, a physical device and its connection may be separated into layers such as IP and transport layers.

Figure 4:
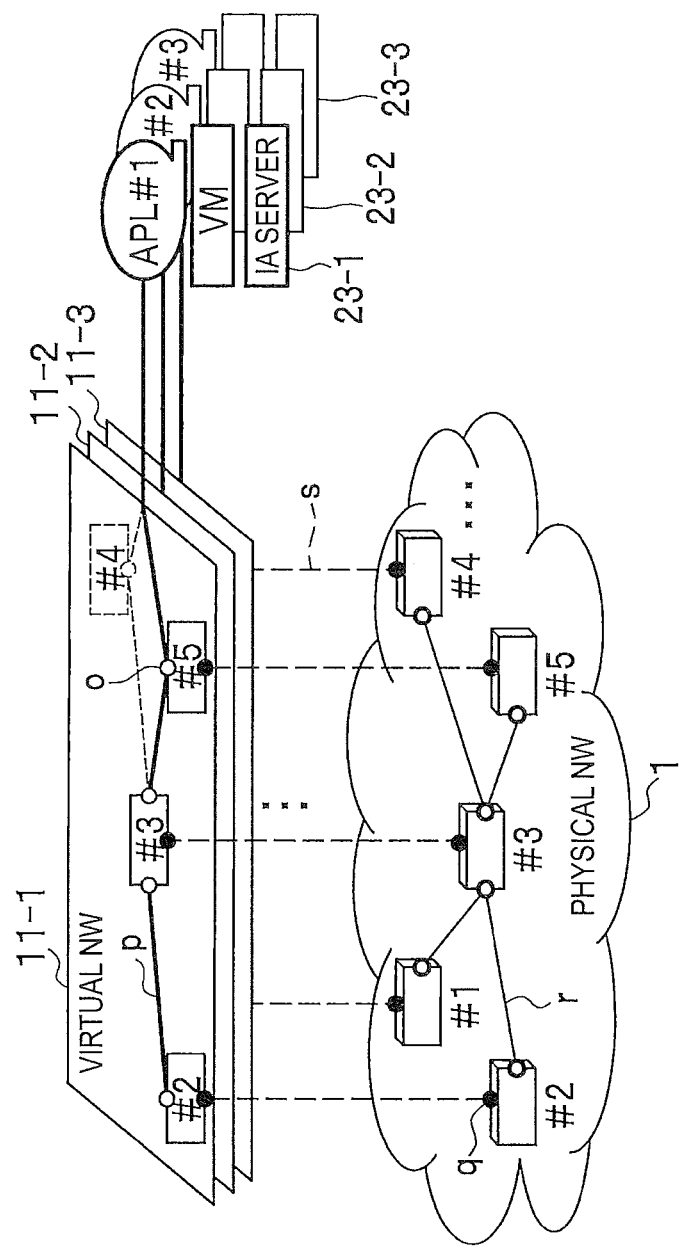
FIG. 4 is a diagram illustrating an example of topology information managed by the network system according to the embodiment of the present invention.
Figure 5:
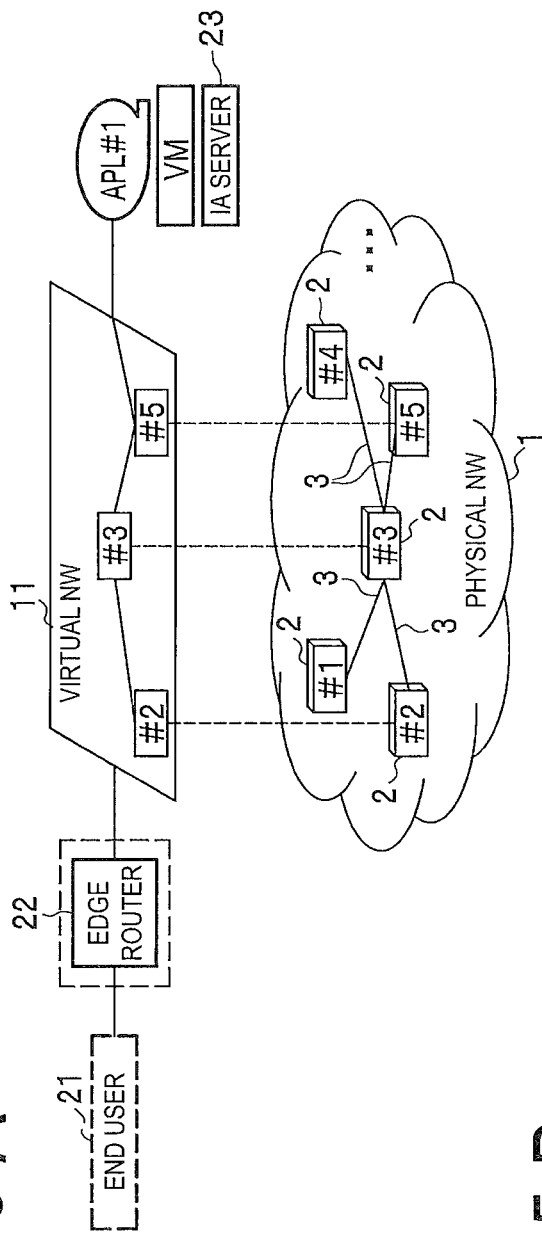
FIGS. 5A and 5B are diagrams illustrating topology information managed by a graph database in the network system according to the embodiment of the present invention.
Figure 5:
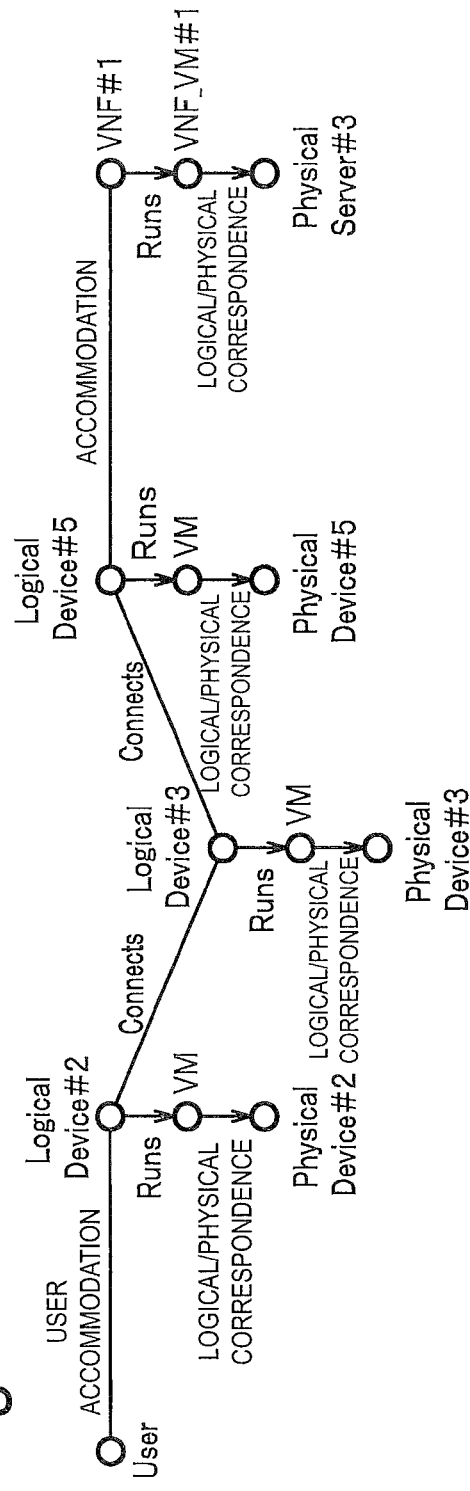

(3) Correspondence information between logical and physical resources (see black circles and dashed lines and a reference sign s in FIG. 4)

The correspondence information between logical and physical resources is, specifically, a correspondence relationship between physical network devices and virtual network devices. An example of the correspondence is a correspondence between a logical resource ID and a physical device name.

FIGS. 5A and 5B are diagrams illustrating topology information managed by the graph database 220 of the network system according to the embodiment of the present invention. FIG. 5A is an image diagram of a graph representation of the topology information and FIG. 5B illustrates a stored example of the topology information illustrated in FIG. 5A.

With networks illustrated in FIG. 5A, topology information is stored in units of nodes (Logical Device #1, Logical Device #3, . . . /Physical Device #1, Physical Device #3 . . . ) in a virtual network 11 and a physical network 1, attributes (logical/physical correspondence), and relationships (Runs and Connects) as illustrated in FIG. 5B.

For example, the Logical Device #1 of the virtual network 11 is connected to an end user 21 via an edge router 22, and the Logical Device #1 is illustrated as a user accommodation indicated by an arrow for a user as illustrated in FIG. 5B. The Logical Device #1 is executed (Runs) on a VM which is constructed on the Physical Device #1 with a logical and physical correspondence (logical/physical correspondence). The Logical Device #1 is interconnected with the Logical Device #3 on the virtual network and the Logical Device #3 is executed (Runs) on a VM which is constructed on the Physical Device #3 with a logical and physical correspondence.

With the connection to an application service on an IA server 23 through the virtual network 11 illustrated in FIG. 5A, VNF #1 is executed (Runs) on VNF_VM #1, which is constructed with the VNF #1 on Physical Server #1 as illustrated in FIG. 5B.

Hereinafter, the operation of the network system configured as described above will be described.

Control Sequence

Figure 6:
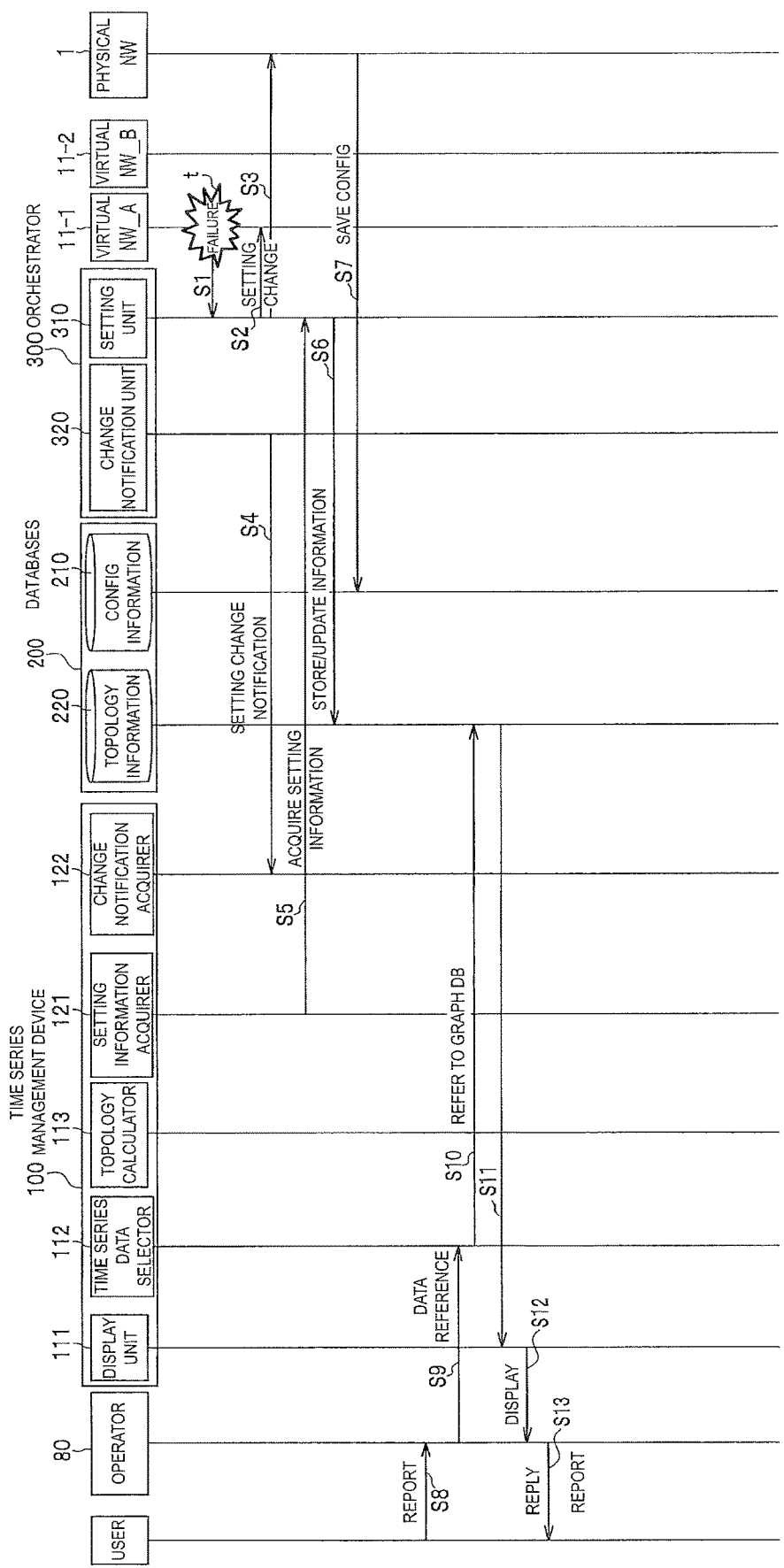
FIG. 6 is a sequence diagram illustrating a topology management method for the network system according to the embodiment of the present invention.
Figure 7:
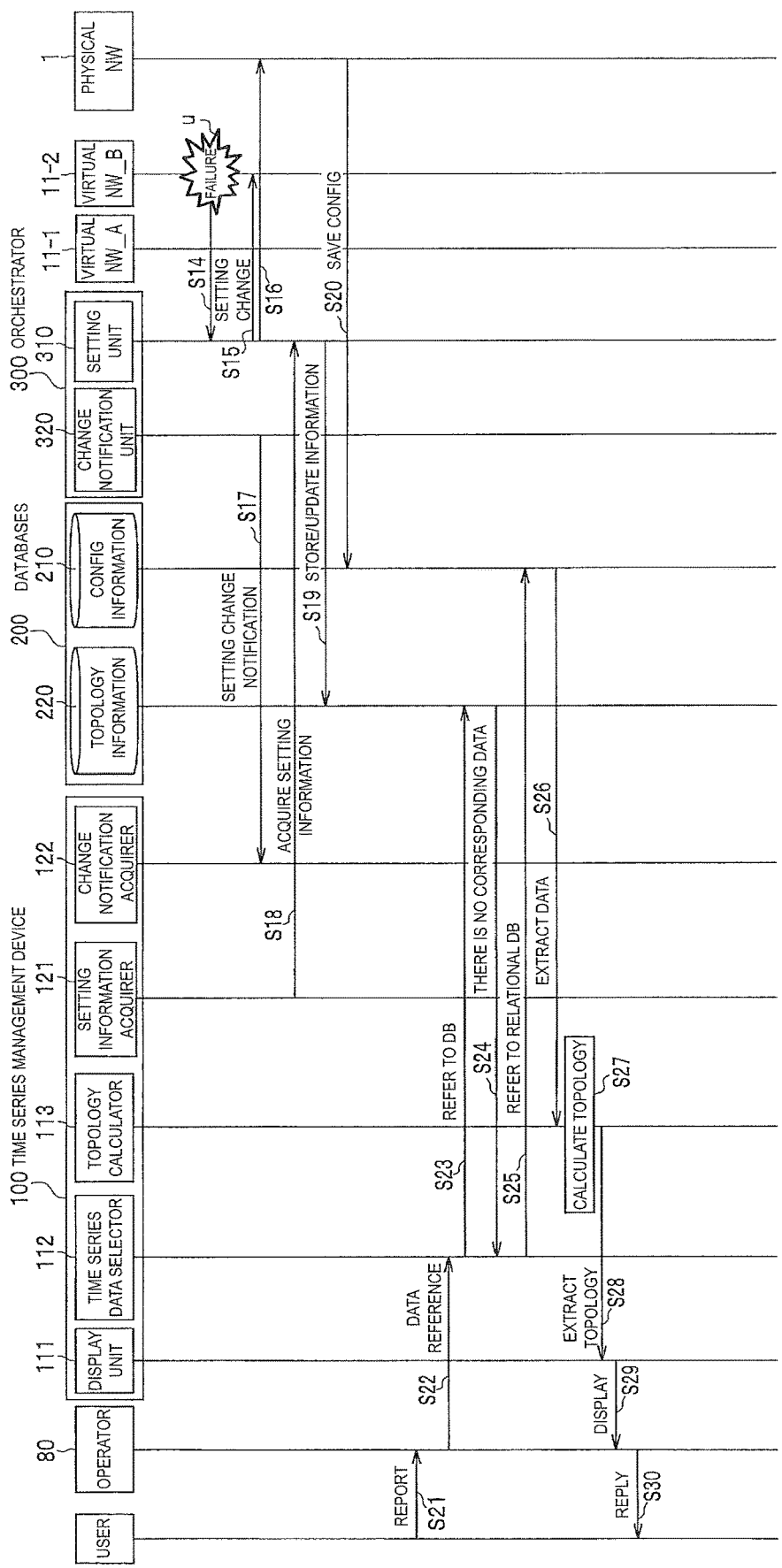
FIG. 7 is a sequence diagram illustrating the topology management method for the network system according to the embodiment of the present invention.

FIG. 6 and FIG. 7 are sequence diagrams illustrating a topology management method for the network system.

In FIG. 6 and FIG. 7, it is assumed that virtual NW_A is the virtual network 11-1 in FIG. 1, virtual NW_B is the virtual network 11-2 in FIG. 1, and physical NW 1 is the physical network 1 in FIG. 1. The operator 80 is an operator who performs virtual network isolation.

Failure Occurrence: 1

When a failure has occurred in the virtual NW_A (see a reference sign t in FIG. 6), a notification of the occurrence of the failure is provided to the setting unit 310 in the orchestrator 300 (step S1). The setting unit 310 in the orchestrator 300 changes the settings of the failed virtual NW_A (transmits setting change information) (step S2) and also changes the setting of the physical NW_A for the physical network (transmits setting change information) (step S3). This is a setting-related function of a general orchestrator (for example, the orchestrator 70 in FIG. 14).

The change notification unit 320 in the orchestrator 300, which is a newly added change notification function, performs the following control. That is, the change notification unit 320 in the orchestrator 300 provides a notification of the setting change to the change notification acquirer 122 in the time series management device 100 (step S4) and the change notification acquirer 122 passes the setting change notification transmitted from the orchestrator 300 to the setting information acquirer 121 (where signals for internal processing are omitted).

Using the change notification from the orchestrator 300 as a trigger, the setting information acquirer 121 acquires the setting information of the virtual NW_A 11-1 (a setting-related function (setting information) of a general orchestrator) from the setting unit 310 in the orchestrator 300 (step S5).

The setting unit 310 in the orchestrator 300 transmits the setting information to the graph database 220, and the graph database 220 stores the transmitted setting information as topology information to update the topology information 220A (step S6).

The physical NW 1 receives a notification of the setting change from the setting unit 310 in the orchestrator 300 and transmits the configuration information to the relational database 210 upon completing the setting change (step S7), and the relational database 210 stores the transmitted configuration information to update the configuration information 210A.

Isolation by Operator 80: 1

On the other hand, the user sends a report to the operator 80 who performs virtual network isolation in a sequence asynchronous with the above (step S8). The operator 80 issues data reference to the time series data selector 112 in the time series management device 100 according to the report (step S9).

The time series data selector 112 receives the reference request for topology information and selects time series data of a period to be referred to (topology information 220A for a time to be referred to) from the topology information stored in the graph database 220 in the storage unit 130 (step S10). The graph database 220 transmits the selected topology information 220A to the display unit 111 in the time series management device 100 (step S11) and the display unit 111 displays the topology information 220A transmitted from the graph database 220 (step S12). The operator 80 replies to the report from the user on the basis of the topology information 220A displayed on the display unit 111 (step S13).

Failure Occurrence: 2

When a failure has occurred in the virtual NW_B (see a reference sign u in FIG. 7), a notification of the occurrence of the failure is provided to the setting unit 310 in the orchestrator 300 (step S14). The setting unit 310 in the orchestrator 300 changes the settings of the failed virtual NW_B (step S15) and also changes the setting of the physical NW_B for the physical network (step S16).

The change notification unit 320 in the orchestrator 300 provides a notification of the setting change to the change notification acquirer 122 in the time series management device 100 (step S17) and the change notification acquirer 122 passes the setting change notification transmitted from the orchestrator 300 to the setting information acquirer 121 (where signals for internal processing are omitted).

Using the change notification from the orchestrator 300 as a trigger, the setting information acquirer 121 acquires the setting information of the virtual NW_B 11-2 from the setting unit 310 in the orchestrator 300 (step S18).

The setting unit 310 in the orchestrator 300 transmits the setting information to the graph database 220, and the graph database 220 stores the transmitted setting information as topology information to update the topology information 220A (step S19).

The physical NW 1 receives a notification of the setting change from the setting unit 310 in the orchestrator 300 and transmits the configuration information to the relational database 210 upon completing the setting change (step S20), and the relational database 210 stores the transmitted configuration information to update the configuration information 210A.

Isolation by Operator 80: 2

On the other hand, the user sends a report to the operator 80 in a sequence asynchronous with the above (step S21). The operator 80 issues data reference to the time series data selector 112 in the time series management device 100 according to the report (step S22).

The time series data selector 112 receives the reference request for topology information and selects time series data of a period to be referred to (topology information 220A for a time to be referred to) from the topology information stored in the graph database 220 in the storage unit 130 (step S23).

In this case, it is assumed that the topology information 220A in the graph database 220 does not include topology information for the specified time. The graph database 220 transmits information indicating that there is no corresponding data to the time series data selector 112 (step S24).

Upon receiving the notification that there is no corresponding data, the time series data selector 112 refers to configuration information 210A in the relational database 210 (step S25). The relational database 210 extracts corresponding data from the configuration information 210A and transmits the data to the topology calculator 113 in the time series management device 100 (step S26).

When there is no data for the period to be referred to (when there is no topology information for the specified time), the topology calculator 113 calculates a topology on the basis of the configuration information 210A stored in the relational database 210 of the storage unit 130 (step S27).

The topology calculator 113 extracts the topology obtained through topology calculation and transmits the extracted topology to the display unit 111 (step S28). The display unit 111 displays the topology calculated by the topology calculator 113 (step S29).

The operator 80 replies to the report from the user on the basis of the topology calculated by the topology calculator 113 (step S30).

Time Series Data Acquisition and Data Reference

Figure 8:
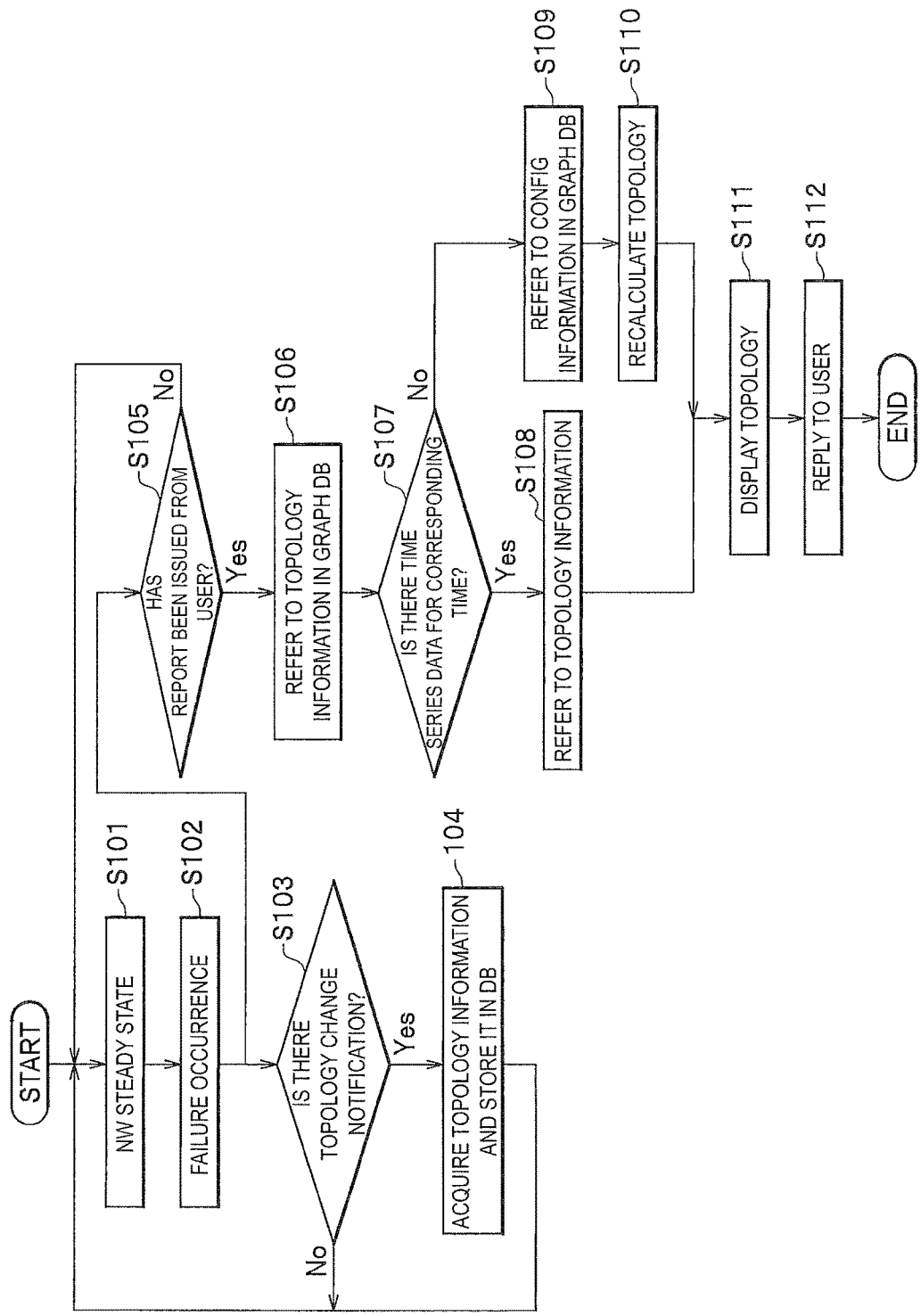
FIG. 8 is a flowchart illustrating time series data acquisition and data reference of the network system according to the embodiment of the present invention.

FIG. 8 is a flowchart illustrating time series data acquisition and data reference of the network system. This procedure is mainly executed by a controller (CPU) included in the time series management device 100.

In step S101, the time series management device 100 confirms that the network is in a steady state. Specifically, the time series management device 100 determines that the network is in a steady state when the change notification acquirer 122 in the time series management device 100 has not received a setting change notification from the orchestrator 300.

In step S102, the time series management device 100 confirms that a failure has occurred. Specifically, when the change notification acquirer 122 in the time series management device 100 has received a setting change notification transmitted from the orchestrator 300, the time series management device 100 determines the occurrence of a failure from content of the setting change notification.

When it is determined in step S102 that a failure has occurred, a process of step S103 and a process of step S105 are performed.

In step S103, the change notification acquirer 122 determines whether there is a topology change notification. If there is no topology change notification (step S103: No), the processing returns to step S101.

When there is a topology change notification (step S103: Yes), the setting information acquirer 121 acquires setting information of the virtual network 11 from the setting unit 310 in the orchestrator 300 using the change notification as a trigger and stores the acquired setting information in the topology information 220A of the graph database 220 in step S104, and the processing returns to step S101.

In step S105, the time series management device 100 determines whether a report has been issued from a user. If no report has been issued from the user (step S105: No), the processing returns to step S101.

If a report has been issued from a user (step S105: Yes), the time series data selector 112 refers to topology information 220A in the graph database 220 in step S106.

In step S107, the time series data selector 112 determines whether there is time series data of the corresponding time (topology information 220A for the time to be referred to). If there is time series data of the corresponding time (step S107: Yes), the topology information management unit 120 refers to the topology information 220A in step S108 and the processing proceeds to step S11.

If there is no time series data of the corresponding time (step S107: No), the topology calculator 113 refers to configuration information 210A in the relational database 210 in step S109. If there is no topology information for the specified time in step S110, the topology calculator 113 calculates a topology from the configuration information 210A in the relational database 210 (performs topology recalculation) and the processing proceeds to step S111.

In step S111, the display unit 111 displays the topology information 220A referred to in the graph database 220 or the topology information 220A calculated by the topology calculator 113.

In step S112, the operator 80 replies to the report from the user on the basis of the topology information 220A and the processing of this flowchart ends.

Operation Task Using Topology Information

Next, an operation using the topology information 220A will be described.

Figure 9:
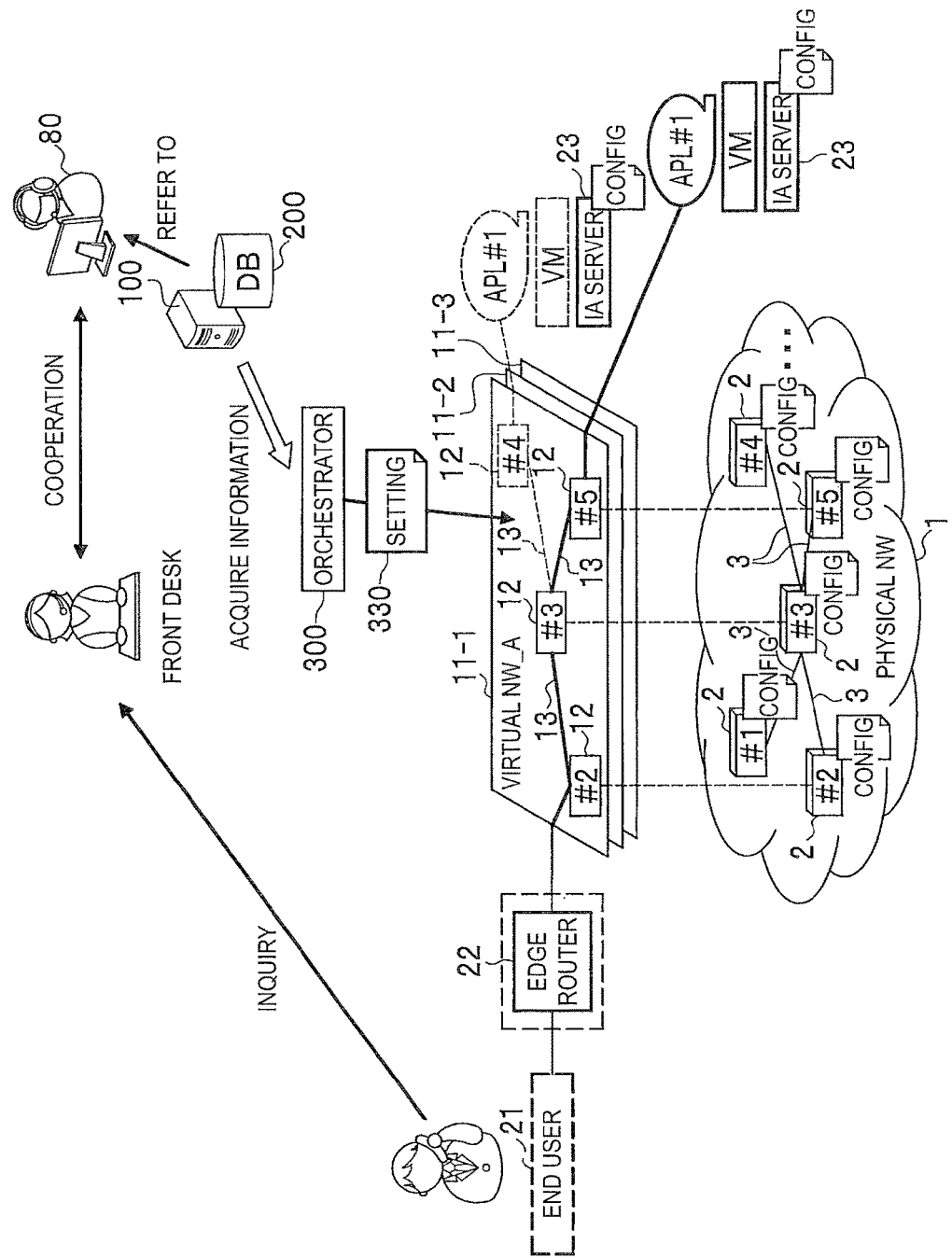
FIG. 9 is a diagram illustrating an operation using topology information of the network system according to the embodiment of the present invention.

FIG. 9 is a diagram illustrating an operation using the topology information 220A.

The network system including the time series management device 100 and the graph database 220 can be applied to an isolation task at the time of issuance of a report from the user.

As illustrated in FIG. 9, a report from the user is received as a telephone call at a front desk. The front desk and the operator 80 are cooperating. The operator 80 performs a task of virtual network isolation according to content of the report from the user. The operator 80 uses the time series management device 100 and the graph database 220 to refer to a past topology and identify the cause of the failure. At this time, the operator 80 is required to perform quick isolation. Identification of the cause of the failure has been described above with reference to FIG. 6 to FIG. 8.

Interval of Network Configuration Change

Next, the interval of network configuration change will be described.

Figure 10:
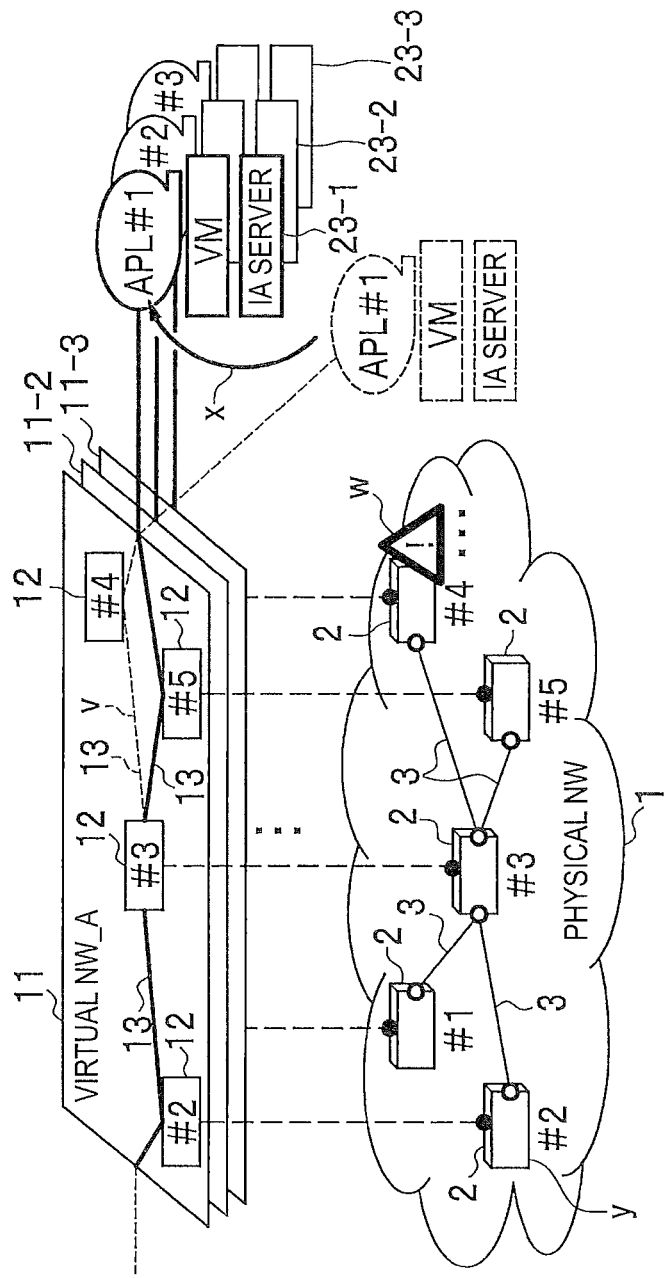
FIG. 10 is a diagram illustrating the interval of network configuration change in the network system according to the embodiment of the present invention.

FIG. 10 is a diagram illustrating the interval of network configuration change.

An automatic measure such as auto-healing (see "automatic control" with a reference sign v in FIG. 10), resource allocation (see "resource rearrangement" with a reference sign x in FIG. 10) using a node 2 in the physical network 1 (see "maintenance of #4" with a reference sign w in FIG. 10), or the like may occur in the virtual networks 11. It is assumed that the interval of change in the virtual networks 11 is shorter than in conventional networks. Even when considered simply, network virtualization and logical/physical isolation increases the number of objects to be changed.

Thus, if an interval of network configuration change is a day, it is assumed to be difficult to follow changes in the network configurations. Therefore, a change interval of several tens of minutes to about one hour is assumed here.

Data Updating of Network Configuration Change Point

Next, data updating of a network configuration change point will be described.

Figure 11:
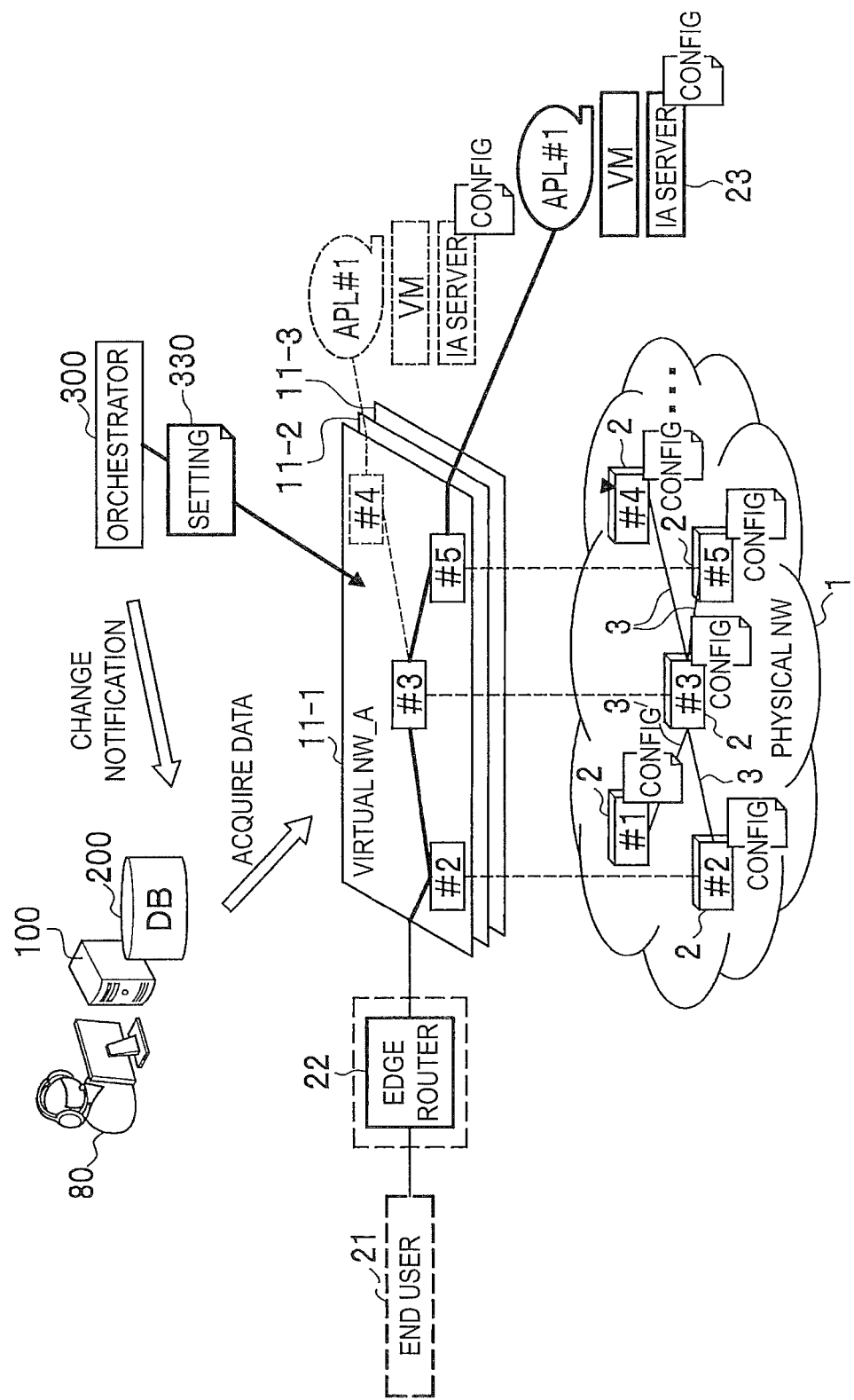
FIG. 11 is a diagram illustrating data updating of a network configuration change point in the network system according to the embodiment of the present invention.

FIG. 11 is a diagram illustrating data updating of a network configuration change point.

As illustrated in FIG. 11, in the orchestrator 300, the setting unit 310 (see FIG. 2) transmits setting information 330 to a virtual network to change the setting of the virtual network. In this case, the change notification unit 320 (see FIG. 2) in the orchestrator 300 provides a notification of the setting change to the change notification acquirer 122 in the time series management device 100. The time series management device 100 acquires topology information 220A from the setting information in accordance with the change notification. Therefore, the time series management device 100 updates data of the graph database 220 only in a portion having a change point. The time series management device 100 does not acquire information on the entire network every time.

For example, data of the topology information 220A in the graph database 220 is updated at an update timing of 20XX/MM/DD/Time1 and then updated at an update timing of 20XX/MMDD/Time2. The time series management device 100 updates data of the graph database 220 only in a portion having a change point at the update timing as described above.

As described above, the network system according to the embodiment of the present invention (see FIG. 1) includes the storage unit 130 that stores topology information 220A (see FIG. 5) in the graph database 220 in chronological order, the topology information 220A including end point information and connection information of logical resources of the virtual network 11, end point information and connection information of physical resources of the physical network 1, and correspondence information between the logical resources and the physical resources; a setting information acquirer 121 in the time series management device 100, which acquires setting information of the virtual network 11 from the orchestrator 300 using a change notification from the orchestrator 300 as a trigger; and the topology information management unit 120 that updates the topology information 220A stored in the graph database 220 of the storage unit 130 on the basis of the acquired setting information.

In virtualized networks formed of a plurality of physical and logical resources, network configurations dynamically change constantly due to software update, maintenance, or the like even if no failures occur. It is difficult to determine a topology in real time because the topology constantly changes. Also, network configurations change without intervention of an operator such as resource optimization and auto-healing may be performed.

In the embodiment of the present invention, by holding topology information from the present to the past, it is possible to determine the topology in real time. It is also possible to cope with the possibility that the network topology may change before and after a failure occurs and to quickly identify the cause and location of the failure.

In the method of referring to the past topology illustrated in FIG. 14, the topology is reconfigured from the logs of the management system and the devices. In this method, there is a problem that the amount of calculation is huge when an enormous number of virtualized networks are reconfigured from logs of a management system and physical devices of a carrier network or the like (see connection relationships between logical resources).

In the embodiment of the present embodiment, by holding topology information from the past to the present, it is not necessary to reconfigure an enormous number of virtualized networks, such that the calculation amount can be significantly reduced and the cause and location of the failure can be quickly identified.

In addition, the time series management device 100 includes the topology reference unit 110 that receives a reference request for the topology information and, when the topology information stored in the storage unit 130 includes data of a period to be referred to, outputs the topology information of the period. When a report has been issued from a user, it is necessary to refer to information of the network configuration at the time of issuance of the report to perform an isolation operation. In the embodiment of the present invention, it is possible to quickly respond to a report from the user and to quickly isolate a failure.

The storage unit 130 stores configuration information of each device of the physical network 1 in the relational database 210. The topology reference unit 110 includes the topology calculator 113 that calculates a topology on the basis of the configuration information stored in the relational database 210 when the topology information 220A in the graph database 220 does not include data of the period to be referred to. Thus, even if the graph database 220 includes no time series data of the period to be referred to (topology information 220A for a time to be referred to), the topology can be calculated from the configuration information 210A, whereby it is possible to respond to a report from the user and to enable failure isolation.

Further, the topology information management unit 120 discards, from the graph database 220, the topology information that has a probability of being referred to of equal to or less than a predetermined value and/or the topology information that is older than a predetermined time. This can delete past data having a low probability of being referred to or the like from the graph database 220 and reduce the amount of data stored in the graph database 220.

The topology reference unit 110 includes the display unit 111 that outputs the topology information referred to by the topology reference unit 110 or the topology calculated by the topology calculator 113. Thus, it is possible to perform an isolation task while visualizing the topology to respond to the user.

All or some of processes described as being performed automatically among the processes described in the embodiments may be performed manually or all or some of processes described as being performed manually may be performed automatically according to a known method. The processing procedures, the control procedures, the specific names, and information including various data and parameters described in the specification or illustrated in the drawings may be arbitrarily changed except for specified cases.

The components of the devices illustrated are functionally conceptual and are not necessarily physically configured as shown. That is, the specific modes of dispersion and integration of the devices are not limited to those illustrated and all or some of the devices can be configured such that they are functionally or physically dispersed or integrated in any units according to various loads, use conditions, or the like.

In addition, each of the configurations, functions, processing units, processing means, and the like described above may be partially or entirely realized in hardware, for example, by designing them in an integrated circuit. Each of the configurations, functions, and the like described above may also be realized in software by a processor interpreting and executing programs that realize the functions. Information such as a program, a table, and a file for realizing each function can be held in a recording device such as a memory, a hard disk, or a solid state drive (SSD) or a recording medium such as an integrated circuit (IC) card, a secure digital (SD) card, or an optical disc.

REFERENCE SIGNS LIST

1 Physical network (infrastructure network)
2, 12 Node
3 Link
11 Virtual network
21 End user
22 Edge router
80 Operator
100 Time series management device
110 Topology reference unit
120 Topology information management unit
111 Display unit (output unit)
112 Time series data selector
113 Topology calculator
121 Setting information acquirer
122 Change notification acquirer
130 Storage unit
200 Databases
210 Relational database
210A Configuration information
220 Graph database
220A Topology information
300 Orchestrator
310 Setting unit
320 Change notification unit

The invention claimed is:

1. A topology management method for a network system, the network system comprising a virtual network formed on a physical network and an orchestrator configured to perform setting control with respect to an environmental change of the virtual network, the topology management method comprising:

storing topology information in a storage medium in chronological order, the topology information comprising end point information and connection information of logical resources of the virtual network, end point information and connection information of physical resources of the physical network, and correspondence information between the logical resources and the physical resources;

acquiring setting information of the virtual network from the orchestrator in response to receiving a change notification from the orchestrator, wherein the change notification indicates a failure on the virtual network;

updating the topology information stored in the storage medium based on the acquired setting information only at a change point corresponding to the failure on the virtual network;

receiving a reference request that requests topology information in a period from a user device;

determining whether the topology information of the period is included in the storage medium;

in response to determining that the topology information of the period is included in the storage medium, obtaining topology information in the period from the storage medium, and returning the topology information to the user device; and in response to determining that the topology information of the period is not included in the storage medium, obtaining configuration information of individual devices of the physical network in the period from the storage medium, performing a topology calculation to obtain a calculated topology for the period based on the configuration information of the individual devices of the physical network, and returning topology information of the calculated topology to the user device.

2. The topology management method according to claim 1, further comprising:

storing the configuration information of the individual devices of the physical network in the storage medium, and calculating a topology based on the configuration information stored in the storage medium when the topology information does not comprise data of the period to be referred to.

3. The topology management method according to claim 2, further comprising:

outputting the topology information referred to by the reference request or the topology calculated when the topology information does not comprise data of the period to be referred to.

4. The topology management method according to claim 1, further comprising:

discarding, from the storage medium, the topology information that has a probability of being referred to of equal to or less than a predetermined value and/or the topology information that is older than a predetermined time.

5. The topology management method according to claim 1, wherein:

a network topology of the virtual network changes over time, and the topology information returned to the user device enables isolation of the failure on the virtual network.

6. A non-transitory computer readable medium storing one or more instructions for causing a computer, which is a server device comprising a virtual network formed on a physical network and an orchestrator configured to perform setting control with respect to an environmental change of the virtual network, to function as:
  a storage procedure configured to store topology information in a storage medium in chronological order, the topology information comprising end point information and connection information of logical resources of the virtual network, end point information and connection information of physical resources of the physical network, and correspondence information between the logical resources and the physical resources;
  a setting information acquisition procedure configured to acquire setting information of the virtual network from the orchestrator in response to receiving a change notification from the orchestrator, wherein the change notification indicates a failure on the virtual network;
  a topology information management procedure configured to update the topology information stored in the storage procedure based on the acquired setting information only at a change point corresponding to the failure on the virtual network; and
  a topology reference procedure configured to: receive a reference request that requests topology information in a period from a user device;
  determine whether the topology information of the period is included in the storage medium;
  in response to determining that the topology information of the period is included in the storage medium, obtain topology information in the period from the storage medium, and return the topology information to the user device; and in response to determining that the topology information of the period is not included in the storage medium, obtain configuration information of individual devices of the physical network in the period from the storage medium, perform a topology calculation to obtain a calculated topology for the period based on the configuration information of the individual devices of the physical network, and return topology information of the calculated topology to the user device.

7. The non-transitory computer readable medium according to claim 6, wherein the storage procedure is configured to store the configuration information of the individual devices of the physical network in the storage medium, and
  the topology reference procedure comprises a topology calculator configured to calculate a topology based on the configuration information stored in the storage procedure when the topology information does not comprise data of the period to be referred to.

8. The non-transitory computer readable medium according to claim 7, further comprising an output procedure configured to output the topology information referred to by the topology reference procedure or the topology calculated by the topology calculator.

9. The non-transitory computer readable medium according to claim 6, wherein the topology information management procedure is configured to discard, from the storage medium, the topology information that has a probability of being referred to of equal to or less than a predetermined value and/or the topology information that is older than a predetermined time.

10. The non-transitory computer readable medium according to claim 6, wherein:
  a network topology of the virtual network changes over time, and
  the topology information returned to the user device enables isolation of the failure on the virtual network.

11. A network system comprising a virtual network formed on a physical network and an orchestrator configured to perform setting control with respect to an environmental change of the virtual network, the network system further comprising:
  a storage medium configured to store topology information in a database in chronological order, the topology information comprising end point information and connection information of logical resources of the virtual network, end point information and connection information of physical resources of the physical network, and correspondence information between the logical resources and the physical resources;
  a setting information acquirer, including one or more processors, configured to acquire setting information of the virtual network from the orchestrator in response to receiving a change notification from the orchestrator, wherein the change notification indicates a failure on the virtual network;
  a topology information management unit, including one or more processors, configured to update the topology information stored in the database of the storage medium based on the acquired setting information only at a change point corresponding to the failure on the virtual network; and
  a topology reference unit, including one or more processors, configured to:
  receive a reference request that requests topology information in a period from a user device;
  determine whether the topology information of the period is included in the storage medium;
  in response to determining that the topology information of the period is included in the storage medium, obtain topology information in the period from the storage medium, and return the topology information to the user device; and
  in response to determining that the topology information of the period is not included in the storage medium, obtain configuration information of individual devices of the physical network in the period from the storage medium, perform a topology calculation to obtain a calculated topology for the period based on the configuration information of the individual devices of the physical network, and return topology information of the calculated topology to the user device.

12. The network system according to claim 11, wherein the storage medium is configured to store the configuration information of the individual devices of the physical network in the database, and
  the topology reference unit comprises a topology calculator configured to calculate a topology based on the configuration information stored in the storage medium when the topology information does not comprise data of the period to be referred to.

13. The network system according to claim 12, further comprising an output unit, including one or more processors, configured to output the topology information referred to by the topology reference unit or the topology calculated by the topology calculator.

14. The network system according to claim 11, wherein the topology information management unit is configured to discard, from the database, the topology information that has a probability of being referred to of equal to or less than a predetermined value and/or the topology information that is older than a predetermined time.

15. The network system according to claim 11, wherein:
a network topology of the virtual network changes over time, and
the topology information returned to the user device enables isolation of the failure on the virtual network.

* * * * *